(12) United States Patent
Koester et al.

(10) Patent No.: US 7,355,819 B2
(45) Date of Patent: Apr. 8, 2008

(54) MACHINING ACTUATOR PERIPHERY TO REDUCE RESONANCE VARIATION

(75) Inventors: David D. Koester, Chanhassen, MN (US); Glenn A. Benson, Lakeville, MN (US); Kurt J. Korkowski, Carver, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1540 days.

(21) Appl. No.: 09/751,669

(22) Filed: Dec. 29, 2000

(65) Prior Publication Data

US 2001/0033461 A1 Oct. 25, 2001

Related U.S. Application Data

(60) Provisional application No. 60/193,603, filed on Mar. 31, 2000.

(51) Int. Cl.
*G11B 5/55* (2006.01)

(52) U.S. Cl. .................................... 360/265.7

(58) Field of Classification Search ............ 360/265.7, 360/254, 254.1, 254.2, 254.3, 254.4, 254.5, 360/254.6, 254.7, 554.8, 254.9, 265.9, 260, 360/245, 266, 264.2, 265.6; 29/603.03; 374/119; 428/463; 419/5

See application file for complete search history.

(56) References Cited

U.S. PATENT DOCUMENTS

| | | | | |
|---|---|---|---|---|
| 4,716,478 A | | 12/1987 | Walsh et al. | 360/104 |
| 4,949,194 A | * | 8/1990 | MacPherson et al. | 360/264.2 |
| 5,156,919 A | * | 10/1992 | Brar et al. | 428/463 |
| 5,729,409 A | | 3/1998 | Ohashi et al. | 360/113 |
| 5,894,382 A | * | 4/1999 | Hyde | 360/265.6 |
| 5,905,608 A | * | 5/1999 | Frees et al. | 360/265.9 |
| 5,930,581 A | * | 7/1999 | Born et al. | 419/5 |
| 6,038,105 A | * | 3/2000 | Wood et al. | 360/265.6 |
| 6,088,194 A | * | 7/2000 | Imaino et al. | 360/266 |
| 6,108,174 A | | 8/2000 | Adams | 360/266.1 |
| 6,151,198 A | * | 11/2000 | Prater et al. | 360/265.7 |
| 6,269,700 B1 | * | 8/2001 | Nikolovski | 374/119 |
| 6,377,424 B1 | * | 4/2002 | Yaeger | 360/245 |
| 6,411,472 B1 | * | 6/2002 | Allsup | 360/265.7 |
| 6,538,853 B1 | * | 3/2003 | Williams et al. | 360/265.9 |

* cited by examiner

*Primary Examiner*—Tianjie Chen
(74) *Attorney, Agent, or Firm*—Derek J. Berger

(57) ABSTRACT

A method of manufacturing a disc drive actuator is provided. The method includes manufacturing a disc drive actuator and machining a peripheral surface of the actuator. The peripheral surface is machined to obtain a desired profile dimension and thereby reduce variations in resonance characteristics from one actuator to the next.

3 Claims, 4 Drawing Sheets

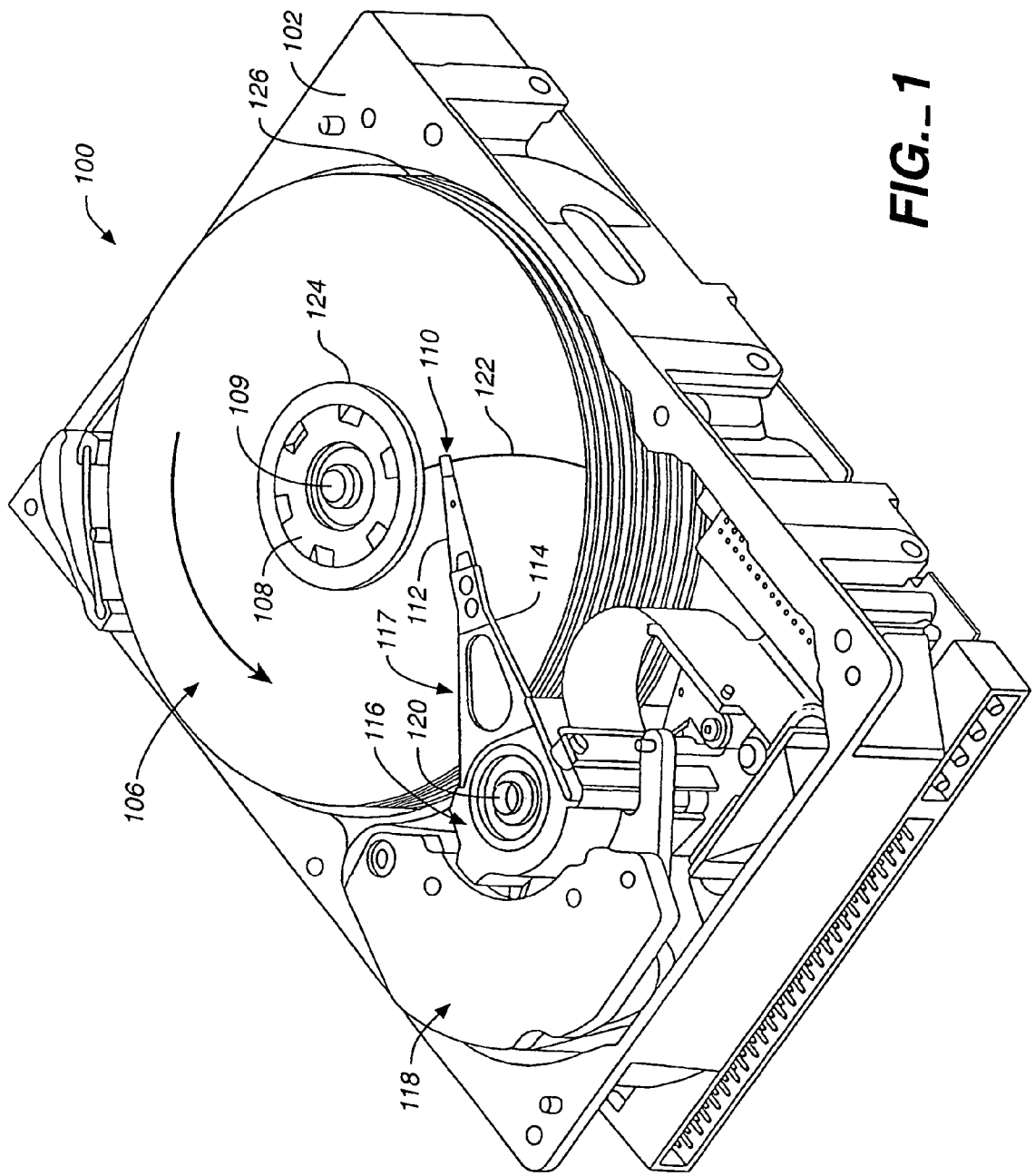
FIG._1

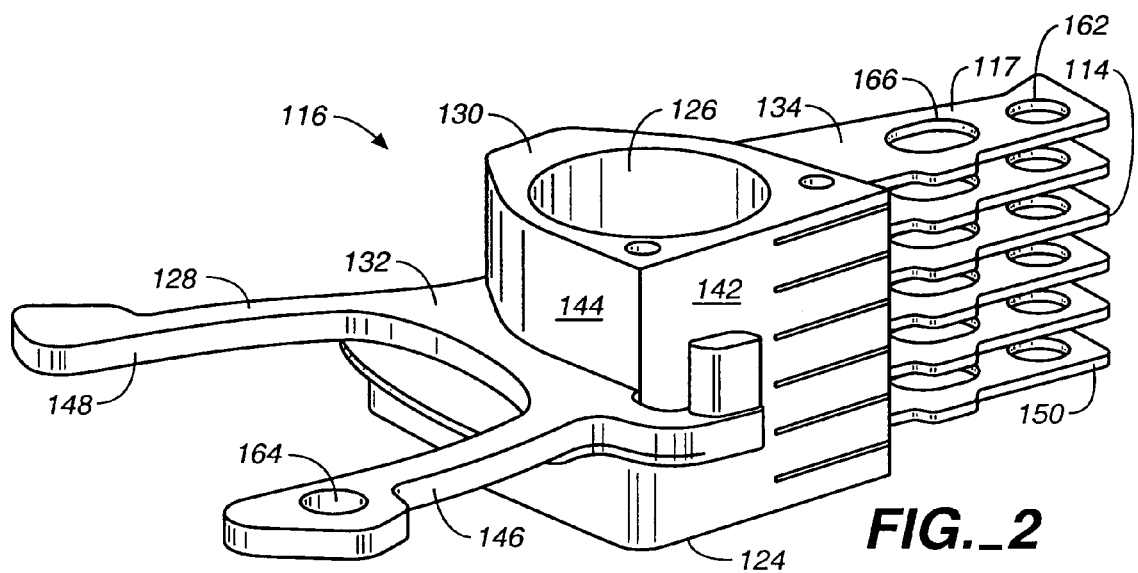
FIG._2
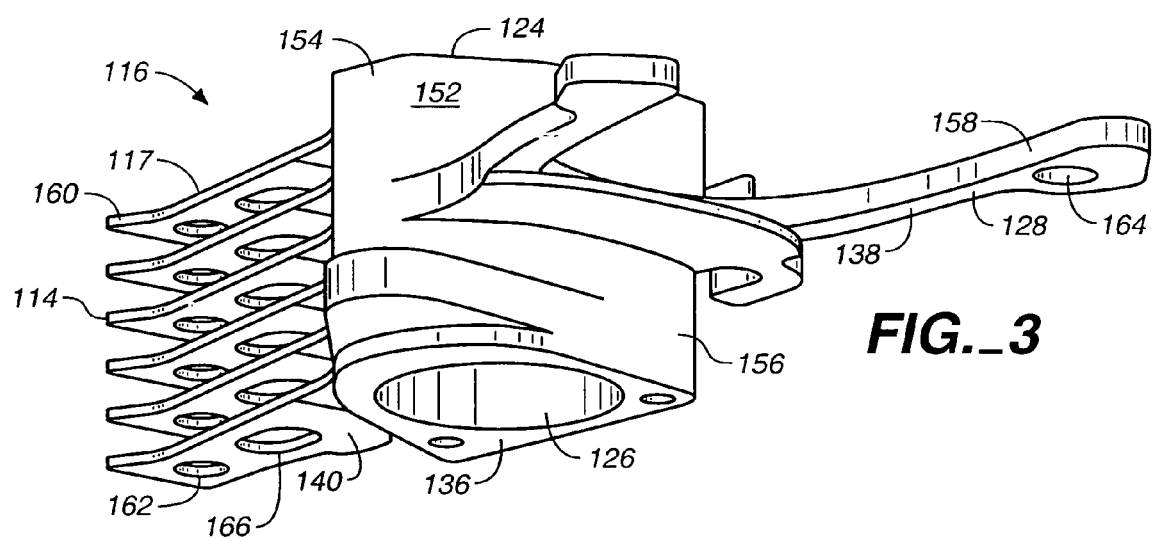
FIG._3

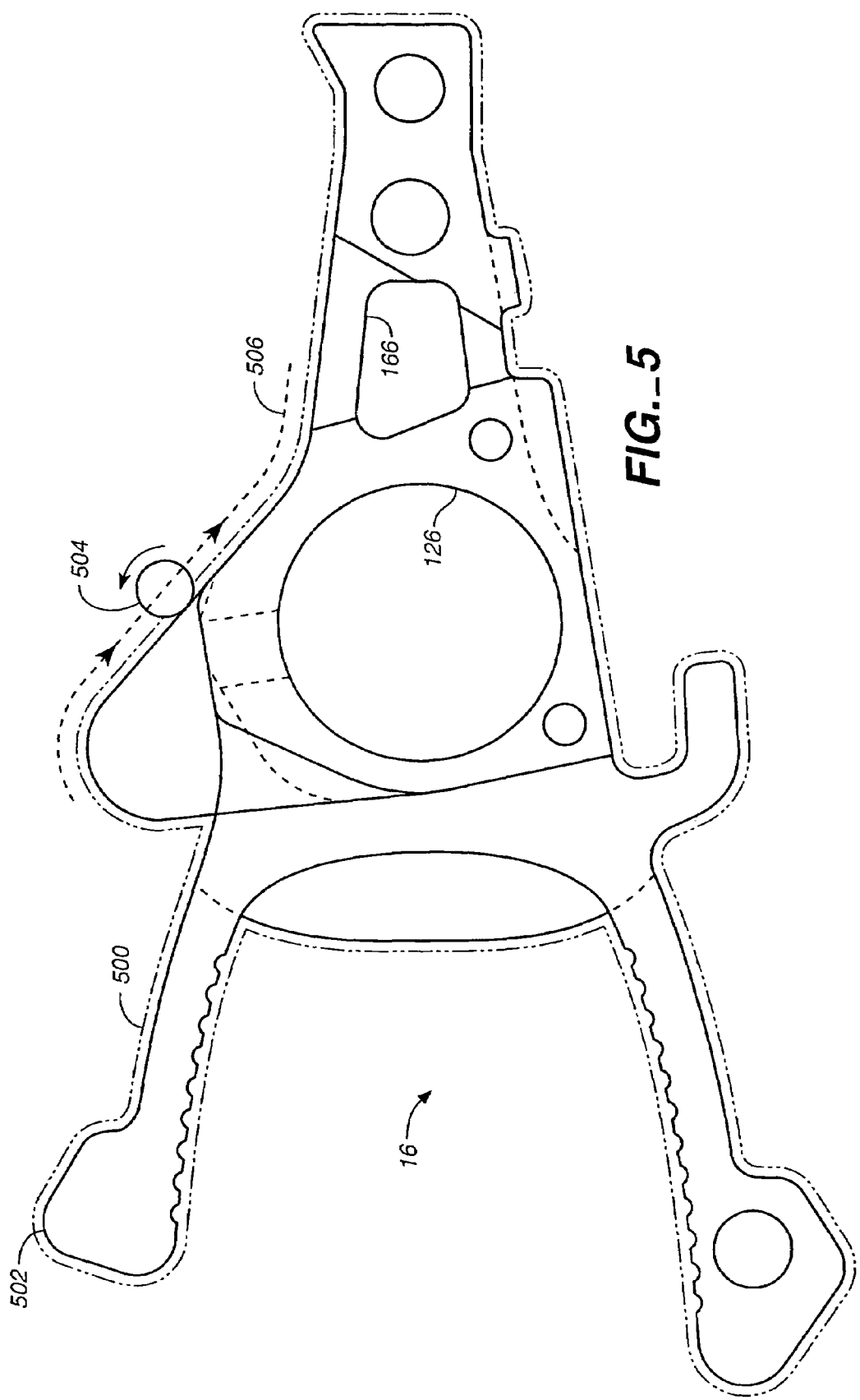

MACHINING ACTUATOR PERIPHERY TO REDUCE RESONANCE VARIATION

CROSS-REFERENCE TO RELATED APPLICATION

This application claims the benefit of U.S. Provisional Patent Application No. 60/193,603, entitled "MACHINING ACTUATOR PERIPHERY TO REDUCE RESONANCE VARIATION," filed on Mar. 31, 2000.

FIELD OF THE INVENTION

The present invention relates generally to disc drive data storage systems. More particularly, the present invention relates to reducing resonance vibration of an actuator in a disc drive.

BACKGROUND OF THE INVENTION

Disc drives read and write information along concentric tracks formed on discs. To locate a particular track on a disc, disc drives typically use embedded servo fields on the disc. These embedded fields are utilized by a servo subsystem to position a head over a particular track. The servo fields are written onto the disc when the disc drive is manufactured and are thereafter simply read by the disc drive to determine position. A servo system samples the position of the read/write head relative to a particular track at a particular sampling rate and adjusts the position of the head.

In a typical servo system, the actual position of the read/write head relative to a given track is sensed and compared to the desired position of the head. A position error signal (PES) indicative of the difference between the actual and desired positions is provided to a servo controller. Based on the value of the position error signal, the servo controller provides a servo control signal to a power amplifier that amplifies the servo control signal and provides it to a voice coil motor. The voice coil motor is coupled to an actuator that moves in response to the application of the amplified control signal to the voice coil motor. The actuator includes an actuator arm that holds the read/write head. In this way, the servo controller controls the positioning of the read/write head relative to a particular track on the disc surface.

Thus, a disk drive mechanical structure is composed of multiple mechanical components that are pieced together to form the final disk drive assembly. Each of these components has various resonant modes that if excited by an external energy source will cause the part to physically move (resonate) at the natural frequencies (resonance frequencies) of oscillation for the component in question. This movement can occur in a variety of different modes, for example, a bending mode, a twisting mode or a combination of the two. One component that contributes greatly to such resonant vibration is the actuator. If a component is highly undamped (i.e. the resonance is high amplitude, narrow frequency band) it will tend to oscillate with a minimal external driving energy. This oscillation results in physical motion of the data head, causing off track errors and potential fly height problems.

If resonances occur in a disk drive, they can severely limit drive performance, both in seek mode and track-follow mode. To obtain the optimal disk drive performance requires that there be no resonances present. However, this scenario is not physically possible. Every mechanical component has a natural frequency of oscillation. Nevertheless, it is desirable to reduce or minimize the resonances. Various schemes can be employed to damp the mechanical components and thereby decrease the amplitude of the resonant mode. Many such resonance-reducing techniques make use of information regarding the resonance characteristics of the disc drive mechanical structure. If the resonance characteristics vary greatly from one drive to the next among a production line of drives, the resonance characteristics data used by the resonance-reducing scheme are likely to be inaccurate. Thus, reducing the variance in the resonance characteristics from one drive to the next will increase the accuracy of the resonance-reducing scheme. Controlling the resonance natural frequency reduces vibration, which in turn allows the servo control loop to be tuned to the mechanical structure.

Present-day disc drive actuators are usually manufactured by casting or extrusion processes. The casting process involves placing a castable substance in a mold or form and allowing it to solidify. Extrusion consists of forcing a semisoft solid material, such as metal, through the orifice of a die to form a continuously formed piece in the desired shape of the actuator. Typically the resulting length of material is then cut into individual longitudinal sections, each corresponding to a single actuator. The placement of each cut thus defines the top of one actuator (on one side of the cut) and the bottom of another actuator (on the other side of the cut). Thus, the cross-sectional shape of the actuators, as viewed from above or below, is defined by the extrusion process.

The processes of casting and extruding actuators inherently have profile tolerances of 0.010 to 0.020 inches. These levels of tolerance result in significant variation in arm resonance from actuator to actuator. As track pitches have increased, the need for more precise control of actuator arm resonance frequencies has increased correspondingly, partially due to the tight tracking requirements and partially due to higher servo loop gain.

The present invention provides a solution to this and other problems and offers other advantages over the prior art.

SUMMARY OF THE INVENTION

The present invention relates to machining the peripheral surfaces of a disc drive actuator to improve tolerances and thereby to reduce variations in resonance characteristics.

One aspect of the present invention is directed to a method of manufacturing a disc drive actuator. Pursuant to the method, the disc drive actuator is manufactured, and a peripheral surface of the actuator is then machined. In one embodiment of the method, the actuator is manufactured such that the peripheral surface has a profile dimension that is greater than a desired final profile dimension. The peripheral surface is then machined by a machining tool to the desired final profile dimension.

Another aspect of the present invention is directed to a disc drive having an actuator that is manufactured according to a specific process. In that process, the actuator is manufactured and then a peripheral surface of the actuator is machined. In one embodiment, the actuator is manufactured such that the peripheral surface has a profile dimension that is greater than a desired final profile dimension. The peripheral surface is then machined to the desired final profile dimension. The machining step can be performed by advancing a machining tool about a periphery of the actuator while maintaining contact between the machining tool and the peripheral surface of the actuator. In another embodiment, the actuator is manufactured by generating an extrusion having a cross-sectional shape substantially that of a desired top cross-sectional shape of the actuator.

Another aspect of the present invention is directed to a disc drive, which includes a disc and an actuator. The disc is rotatable about a central axis. The actuator supports and actuates a transducer relative to the disc and has a peripheral surface which is machined to a desired profile dimension within a tolerance that is defined for limiting variations in resonance characteristics of the actuator.

These and various other features as well as advantages which characterize the present invention will be apparent upon reading of the following detailed description and review of the associated drawings.

BRIEF DESCRIPTION OF THE DRAWINGS

FIG. 1 is a top view of a disc drive suitable for use with the present invention.

FIG. 2 is a top perspective view of an actuator according to an illustrative embodiment of the present invention.

FIG. 3 is a bottom perspective view of an actuator according to an illustrative embodiment of the present invention.

FIG. 5 is a top view of an actuator depicting a machining process according to an illustrative embodiment of the present invention.

DETAILED DESCRIPTION OF ILLUSTRATIVE EMBODIMENTS

Figure 4:
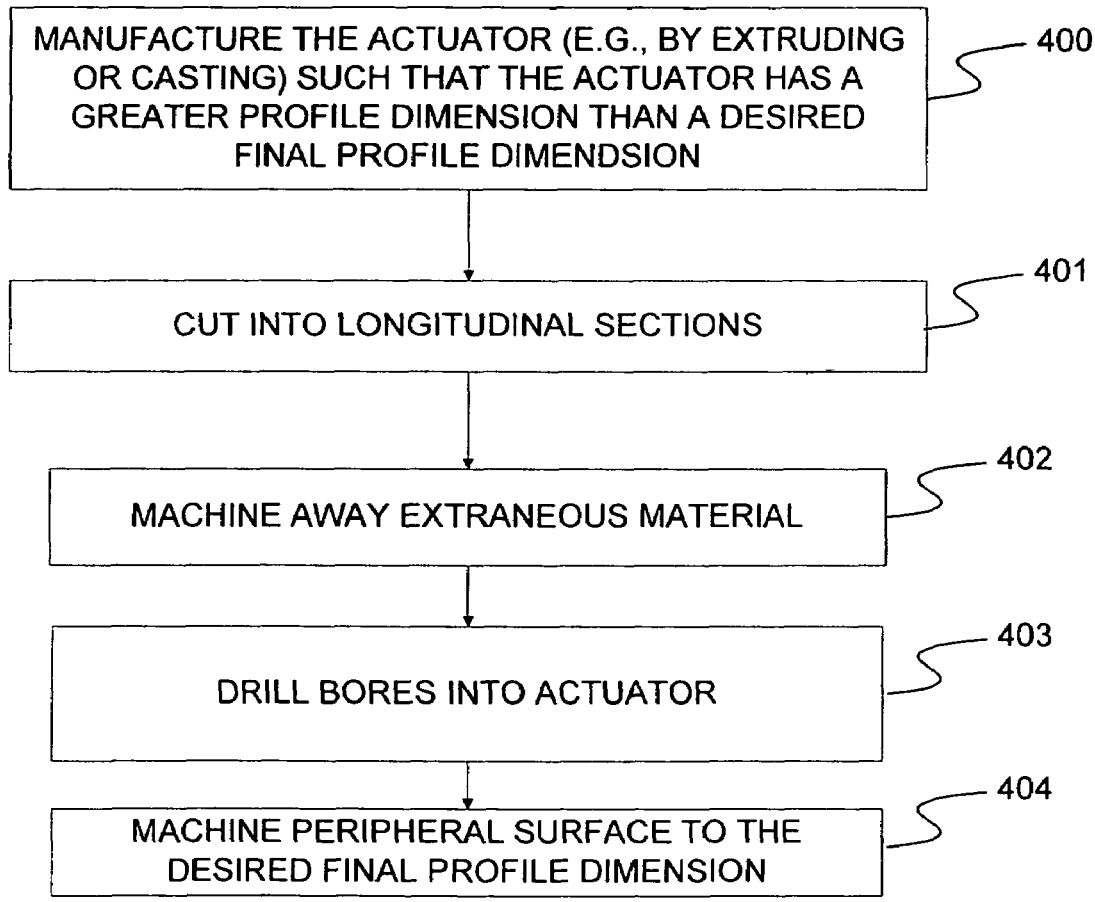
FIG. 4 is a flow chart representing a method of manufacturing a disc drive actuator according to an illustrative embodiment of the present invention.

FIG. 1 is a top view of a disc drive 100 in accordance with one embodiment of the present invention. Disc drive 100 includes a disc pack 106 mounted for rotation about spindle 109. Disc pack 106 includes a plurality of individual discs, each of which include concentric tracks, or cylinders, for receiving and storing data in the form of magnetic flux reversals encoded on the tracks. It should be noted that although the present invention is described herein with reference to a magnetic disc system, the invention is equally applicable to disc drives which utilize discs employing other means of data storage, such as optical discs. Disc drive 100 also includes an actuator 116 mounted to a base 102 and pivotally moveable relative to discs 106 about pivot shaft 120. Actuator 116 includes E-block assembly 117 which includes a plurality of actuator arms 114. Each actuator arm 114 is attached to one or more flexure arms 112. Each flexure arm 112 supports a data head 110. Data head 110 includes a hydrodynamic air bearing, or slider, which supports a transducer for reading information from and encoding information to one of the discs 106. In an illustrative embodiment, actuator 116 includes a voice coil motor (VCM), or moving coil motor, shown generally at 118. Disc drive 100 further includes a drive controller (not shown) which is coupled to a host system or another controller which controls a plurality of drives. In an illustrative embodiment, the drive controller is a microprocessor, or digital computer. The drive controller is either mountable within disc drive 100, or is located outside of disc drive 100 with suitable connection to actuator 116.

During operation, the drive controller receives position information indicating a track of the disc 106 to be accessed. The drive controller receives the position information from an operator, from a host computer, or from another suitable controller. Based on the position information, the drive controller provides a position signal to actuator 116. The position signal causes actuator 116 to pivot about pivot shaft 120. In an illustrative embodiment, the position signal comprises a current supplied to the voice coil motor 118, causing actuator 116 to pivot about pivot shaft 120. This, in turn, causes data head 110 to move radially over the surface of the disc 106 in a generally arcuate path indicated by arrow 122.

Each of the mechanical components of disc drive 100 has various resonant modes that, if excited by an energy source, such as voice coil motor 118, will cause the part to oscillate at the natural resonance frequencies of the component. It is of particular importance to minimize the resonance of actuator 116, because it is coupled to voice coil motor 118, which is a potential source of excitation energy, and because it directly controls the position of data head 110.

FIGS. 2 and 3 are perspective views of an actuator 116 according to an illustrative embodiment of the present invention. FIG. 2 is a top view and FIG. 3 is a bottom view. Actuator 116 includes actuator body 124 having a pivot bore 126 running therethrough which receives pivot shaft 120. E-block 117 extends outwardly from actuator body 124 and includes multiple actuator arms 114. Each actuator arm 114 is adapted to couple to one or more flexure arms 112, each of which, in turn, supports a data head 110. Pivot bore 120 recieves pivot shaft 120 and actuator 116 rotates about pivot shaft 120 in order to position data heads 110 relative to disc surfaces 106. In one illustrative embodiment, in a disc drive 100 that has more than one disc in disc pack 106, each actuator that is positioned between two discs couples to two flexure arms 112, one of which supports a data head 110 for writing/reading data to/from the disc positioned above that actuator arm 114, and the other of which supports a data head 110 for writing/reading data to/from the disc positioned below that actuator arm 114. Illustratively, one flexure arm 112 couples to the top of the actuator arm 114 and the other couples to the bottom of the actuator arm 114. On the opposite side of the actuator body 124 from E-block 117 is voice coil support 128, which supports a coil (not shown) which lies between a pair of permanent magnets, one above and one below. When drive current is applied to the coil, actuator 116 pivots about pivot shaft 120, thereby positioning data heads 110 relative to disc pack 106.

For the purpose of the present application, surfaces 130, 132 and 134 (FIG. 2), along with all other surfaces so oriented, will be referred to as top surfaces, as these surfaces face upwardly when the drive 100 is disposed horizontally. Correspondingly, surfaces 136, 138 and 140 (FIG. 3), as well as all other surfaces facing in the same direction, will be referred to as bottom surfaces. All external surfaces of actuator 116 that are not substantially parallel to top surfaces 130, 132 and 134 and bottom surfaces 136, 138 and 140 are thus referred to as peripheral surfaces. In FIGS. 2 and 3, such peripheral surfaces include surfaces 142, 144, 146, 148, 150, 152, 154, 156, 158 and 160. In an illustrative embodiment, surfaces referred to as peripheral surfaces are substantially orthogonal to top surfaces 130, 132 and 134 and bottom surfaces 136, 138 and 140. However, it is within the contemplated scope of the present invention that surfaces not orthogonal to top surfaces 130, 132 and 134 and bottom surfaces 136, 138 and 140, yet not parallel to top surfaces 130, 132 and 134 and bottom surfaces 136, 138 and 140, also constitute peripheral surfaces.

FIG. 4 is a flow chart representing a method of manufacturing a disc drive actuator 116 according to an illustrative embodiment of the present invention. At step 400, the actuator 116 is manufactured. According to an illustrative embodiment of the present invention, actuator 116 is manufactured by extruding a length of solid material into an extrusion having a cross-sectional shape that is substantially the desired cross-sectional shape of the actuator 116 as viewed from the top or bottom. In an alternative embodiment, actuator 116 is manufactured by casting a material in a mold having the desired shape of the actuator. According to an illustrative embodiment of the present invention, the actuator 116 is extruded or cast such that a peripheral surface (142, 144, 146, 148, 150, 152, 154, 156, 158, 160 in FIGS. 2 and 3) has a profile dimension that is greater than a desired final profile dimension. In an illustrative embodiment of the present invention, actuator 116 is made from aluminum. But actuator 116 can also be made from magnesium, steel or many other materials.

The length of material is then cut into longitudinal sections, at step 401, such that each longitudinal section corresponds to a single actuator 116. The length of extruded material is illustratively also further cut or machined, at step 402, to achieve the desired shape of the actuator, as is known in the art. For example, extraneous material above and below voice coil support 128 is cut or machined away. Similarly, material above, below and between actuator arms 114 is cut or machined away. Illustratively, after actuator 116 is produced by extrusion or casting, pivot bore 126, as well as any other bores through actuator 116, such as actuator arm bore 162 and voice coil support bore 164, are drilled at step 403.

At step 404, the peripheral surface (such as one or more of the surfaces 142, 144, 146, 148, 150, 152, 154, 156, 158 and 160 in FIGS. 2 and 3) of the actuator is machined to a desired final profile dimension. The present invention contemplates machining any peripheral surface of actuator 116. Thus, in one embodiment of the present invention, peripheral surface 142 of actuator body 130 is machined. In another embodiment, peripheral surface 150 of actuator arms 114 are machined, and so forth. In a further embodiment, substantially the entire periphery of actuator 116 is machined, i.e., substantially every peripheral surface of actuator 116 is machined.

According to an illustrative embodiment of the present invention, the peripheral surface is machined to a specified desired profile dimension. The profile dimension is hereby defined as the dimension perpendicular to the surface when viewed from above or below.

In an illustrative embodiment, the entire height of a given peripheral surface is machined, though it is within the scope of the present invention to machine only a particular segment of the height of the peripheral surface.

Machining the periphery allows the surface to be manufactured to a lower tolerance than if the surface is simply extruded or molded without machining the surface. That is, the precise profile dimension of the surface can be achieved with greater accuracy and greater certainty. Thus, when manufacturing a group of similar actuators, there will be less variance in the profile dimensions from one actuator to the next. This reduced degree of variance in the dimensions of a plurality of manufactured actuators results in a reduced degree of variance in the resonance characteristics from one actuator to the next. Therefore, if the resonance characteristics of one actuator, of a group of like-manufactured actuators, are known, those characteristics can be attributed to the other actuators in the group to a greater degree of accuracy. Thus the resonance of the actuator during operation of the drive can be reduced with greater accuracy.

According to an illustrative embodiment of the present invention, a peripheral surface of the actuator is machined to a profile tolerance of 0.010 inches or less. Prior art extrusion and casting processes have profile tolerances of 0.010 inches to 0.020 inches. In one embodiment of the present invention, the periphery is machined to a tolerance having a range from 0.005 to 0.010 inches and in another embodiment, the periphery is machined to a tolerance of 0.005 inches or less.

FIG. 5 is a top view of actuator 116. Dashed line 500 shows the profile dimension of the peripheral surface after the extrusion or casting of actuator 116 according to the present invention. Solid line 502 shows the desired profile of the peripheral surface. Profile dimension 502 is achieved by machining the surface according to the present invention. Manufacturing (extruding or casting) actuator 116 such that the peripheral surface has a profile dimension 500 that is greater than the desired final profile dimension 502 allows the desired profile 502 to be attained after machining. In an illustrative embodiment of the present invention, actuator 116 is manufactured such that the peripheral surface has a profile dimension 500 that is greater than the desired final profile dimension 502 by an amount ranging from 0.020 inches to 0.030 inches. The machining process then removes the excess 0.020-0.030 inches to achieve the desired profile 502.

According to an illustrative embodiment of the present invention, the machining of the peripheral surface is achieved by advancing machining tool 504 about the periphery of actuator 116 while maintaining contact between the machining tool and the peripheral surface of the actuator. Machining tool 504 is illustratively an end mill that is advanced about the periphery of the actuator along a predetermined path designated by dashed line 506. End mill 504 illustratively has a rotating shank with cutting teeth at the end and spiral blades on the peripheral surface. In an illustrative embodiment, path 506 of end mill 504 is controlled via numeric control (NC), whereby the path is stored in computer memory and accessed to dictate the path of the machining tool. The numeric control provides a path such that the cutting mechanism of end mill 504 cuts into the extruded or cast surface 500 by the desired amount - in one embodiment, between 0.020 and 0.030 inches. Illustratively, the position of end mill 504 relative to the height of actuator 116 can also be varied in order to machine surfaces that have overhanging or underhanging parts of actuator 116 protruding above or below them, such as surface 144 of actuator body 130 (see FIG. 2) and surface 156 of actuator body 130 (see FIG. 3). In another illustrative embodiment, the interior surface of pivot bore 126 is also machined. Other bores in actuator 116, such as actuator arm bore 166, can also be machined according to the present invention, as long as the diameter of the bore is large enough to accept machining tool 504.

The present invention is further directed to an actuator 116 manufactured according to the above-described process, and to a disc drive 100 having an actuator 116 that is manufactured according to the above-described process.

In summary, aspect of the present invention is directed to a method of manufacturing a disc drive actuator 116. Pursuant to the method, the disc drive actuator 116 is manufactured, and a peripheral surface, such as one or more of the surfaces 142, 144, 146, 148, 150, 152, 154, 156, 158 and 160 of the actuator 116 is then machined. In one embodiment of the method, the actuator 116 is manufactured such that the peripheral surface 142, 144, 146, 148, 150, 152, 154, 156, 158, 160 has a profile dimension 500 that is greater than a desired final profile dimension 502. The peripheral surface 142, 144, 146, 148, 150, 152, 154, 156, 158, 160 is then machined by machining tool 504 to the desired final profile dimension 502.

Another aspect of the present invention is directed to a disc drive 100 having an actuator 116 that is manufactured according to a specific process. In that process, the actuator 116 is manufactured and then a peripheral surface, such as one or more of the surfaces 142, 144, 146, 148, 150, 152, 154, 156, 158, and 160 of the actuator 116 is machined. In one embodiment, the actuator 116 is manufactured such that the peripheral surface 142, 144, 146, 148, 150, 152, 154, 156, 158, 160 has a profile dimension 500 that is greater than a desired final profile dimension 502. The peripheral surface 142, 144, 146, 148, 150, 152, 154, 156, 158, 160 is then machined to the desired final profile dimension 502. The machining step can be performed by advancing a machining tool 504 about a periphery of the actuator 116 while maintaining contact between the machining tool 504 and the peripheral surface 142, 144, 146, 148, 150, 152, 154, 156, 158, 160 of the actuator 116. In one embodiment of the above-described disc drive 100, the actuator 116 is manufactured by generating an extrusion having a cross-sectional shape 502 substantially that of a desired top cross-sectional shape 502 of the actuator 116.

Another aspect of the present invention is directed to a disc drive 100, which includes a disc 106 and an actuator 116. The disc 106 is rotatable about a central axis 109. The actuator supports and actuates a transducer 110 relative to the disc 109 and has a peripheral surface 142, 144, 146, 148, 150, 152, 154, 156, 158, 160 which is machined to a desired profile dimension 502 within a tolerance that is defined for limiting variations in resonance characteristics of the actuator 116.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the actuator manufacturing method of the present invention may be employed with disc drives that use nonmagnetic data storage means, for example, optical storage devices, without departing from the scope and spirit of the present invention. Also, any suitable tool can be used to machine the peripheral surface of the actuator. An end mill was provided as an example only. Other modifications can also be made.

What is claimed is:

1. A disc drive comprising:
a disc rotatable about a central axis; and
actuator means for supporting and actuating a transducer relative to the disc and having a machined external peripheral surface with a desired profile dimension, which is within a tolerance of less than 0.010 inches relative to the desired profile dimension, that is defined for limiting variations in resonance characteristics of the actuator means.

2. The disc drive of claim 1 wherein the machined external peripheral surface extends along an entire periphery of the actuator means such that the desired profile dimension is defined entirely by the machined peripheral surface.

3. The disc drive of claim 1 wherein the machined external peripheral surface of the actuator has a tolerance of 0.005 inches or less relative to the desired profile dimension.

* * * * *